United States Patent Office 3,251,705
Patented May 17, 1966

3,251,705
PROCESS FOR IMPROVING GLOSS RETENTION AND CHALKING RESISTANCE OF RUTILE PIGMENTS
Gerhard Rieck and Helmut Weber, Leverkusen, Germany, assignors to Titangesellschaft m.b.H., Leverkusen, Germany, a corporation of Germany
No Drawing. Filed Oct. 30, 1962, Ser. No. 234,225
Claims priority, application Germany, Oct. 31, 1961, T 21,053
6 Claims. (Cl. 106—300)

The present invention relates in general to $TiO_2$ pigment having improved pigmentary properties and more particularly to a superior method for producing a $TiO_2$ pigment having improved gloss retention and chalking resistance.

The paint and varnish industries are continually increasing their stringent specifications in the fields of paint, air-drying varnishes and baking enamels with respect to the chalking resistance and gloss retention of the $TiO_2$ pigment used in its products; and attempts have been made for quite some time to improve the chalking resistance and gloss retention of the $TiO_2$ pigment. For example the calcined and milled $TiO_2$ pigment has been slurried in water, with the addition of a dispersing agent, as the case may be, followed by wet milling and/or classification after which it has been mixed with a water-soluble silicate and/or a water-soluble aluminum salt and/or other metal salts and alkali, filtered, washed, dried and milled. Such post-calcination treated $TiO_2$ pigments show some improvement in chalking resistance as compared with that of untreated $TiO_2$ pigment. However, still better chalking resistance is desirable in some fields of application. In addition, an attempt has been made to improve the pigmentary properties of a post-calcination treated pigment by subsequent calcination. However $TiO_2$ pigments so prepared still fail to have the high gloss retention and chalking resistance presently required by the industry.

An object, therefore, of the present invention is to provide a relatively simple and economical method for producing an improved $TiO_2$ pigment for use in paints, varnishes and enamels. A further object of the invention is to provide an improved method for producing a rutile $TiO_2$ pigment which will retain its high gloss and resist chalking even after long periods of weathering. These and other objects, features and advantages of the invention will be described and illustrated more fully in the description which follows hereinafter.

In its broadest aspects the present invention relates to an improved method for producing a $TiO_2$ pigment having superior gloss retention and chalking resistance wherein a calcined $TiO_2$ pigment is treated initially with water-soluble salts of aluminum and silicon to coat the pigment with the corresponding hydrous oxides after which the oxide coated pigment is treated a second time with water-soluble salts of aluminum and silicon, or titanium, aluminum and silicon, to form a second coating of the corresponding hydrous oxides on the pigment.

The $TiO_2$ pigment used in the process of the instant invention may be either an anatase or rutile modification but is preferably of the rutile modification and may be the product of the so-called sulfate process wherein the pigment is produced from a hydrate precipitated from a titanium sulfate solution; or the product of the so-called vapor phase process wherein vaporous $TiCl_4$ is reacted with oxygen at elevated temperatures to form $TiO_2$.

The process of the invention is characterized by two successive post-calcination treatments, the first being carried out by wet-milling an aqueous slurry of calcined $TiO_2$ with the aid of a dispersing agent, if necessary, followed by classification; and then adding to the classified pigment, in any desired sequence, and with thorough mixing, a water-soluble silicate as for example sodium silicate, a water-soluble aluminum salt such as for example aluminum sulfate and/or, if desired other soluble metal compounds or salts capable of forming insoluble substantially colorless compounds; or substantially insoluble hydrous metal oxides. In the event the suspension so formed is acid an alkali or ammonia is added to neutralize the acid suspension and additional anions are added to precipitate the metal compounds as insoluble hydrous metal oxides on the pigment. Should the suspension be alkaline it is neutralized by the addition of an acid.

Following precipitation of the insoluble metal oxides as a hydrous metal oxide coating on the pigment, the suspension is neutralized by the addition of an alkali or ammonia and filtered after which the coated pigment is washed, dried and milled.

The second post-calcination treatment has been found not only to improve gloss retention and chalking resistance of the pigment but also other properties such as brightness, color-tone and dispersibility and is carried out in a manner similar to the first post-calcination treatment but using as the pigment source, the hydrous metal oxide coated pigment produced by the first post-calcination treatment. Moreover, while in the first post-calcination treatment it is essential that the pigment slurry be wet-milled and/or classified frequently in order to maintain a good dispersion of the relatively coarse aggregates previously produced during calcination of the pigment, no wet-milling and/or classification is necessary during the second post-calcination treatment.

Concerning the treating agents used, significant improvements in gloss retention and chalking resistance have been obtained using a water-soluble silicate and water-soluble aluminum salt in both the first and second post-calcination treatments. However particularly outstanding results have been achieved where a water-soluble titanium salt is used in conjunction with the water-soluble salts of silicon and aluminum in the second post-calcination treatment. Moreover, with this combination of water-soluble salts it has been found especially advantageous to add the aforesaid salts in a particular sequence, namely, titanium-silicate-aluminum.

The amount of soluble metal salts used are generally in the range of from 0.5 to 5.0% calculated as the oxides on a $TiO_2$ weight basis, the specific amounts employed depending upon the type of soluble salt used. Particularly good results are obtained according to the process of this invention if, in the first post-calcination treatment, the silica and aluminum salts are used in amounts ranging from 1% to 2% calculated as the oxides on a $TiO_2$ weight basis. The use of less than 0.5% calculated as the oxide, of each metal salt in the first post-calcination treatment gives unsatisfactory results and hence is not suitable while amounts in excess of 5.0% effect no appreciable improvements over the results achieved by using 5.0% and hence are uneconomical. In general the preferred range is from 1.0–2.0% calculated as the oxides on a $TiO_2$ basis but it will be understood that other proportions may be used within the range of from 0.5–5.0%.

While some improvement in gloss retention and chalking resistance has been achieved by using an aluminum salt alone the results are not as good as when the aluminum salt is used in conjunction with the silicate; while the use of the silicate alone is prone to create filtering problems and produce a pigment having inferior pigmentary properties.

As pointed out above the treatment steps employed in the first and second post-calcination treatments are quite similar and accordingly the amounts of the water-soluble salts used in the second post-calcination treatment may be and generally are in the same range as those used in the first post-calcination treatment.

Further as to the amounts of water-soluble salts used, it has been found that the improvements in gloss retention and chalking resistance achieved by the present invention are attributed only slightly to an increase in the amount of hydrous metal oxide on the pigment, i.e., to coat the pigment in one treatment step with hydrous oxides in an amount equivalent to that deposited in two successive steps will not produce a pigment having as good pigmentary characteristics as those of a pigment which has been subjected to two successive treatments. In brief the remarkable improvements in gloss retention and chalking resistance effected by the invention are due primarily to treating the pigment with the water-soluble salts of silica, aluminum and/or titanium in two successive post-calcination treatment steps and not to the total amount of hydrous metal oxides deposited on the pigment.

In order to test the hydrous metal oxide coated $TiO_2$ pigment produced according to the process of this invention for gloss retention and chalking resistance the coated pigment was incorporated in a varnish prepared as follows: A dispersion was prepared of a 50% solution of a long-oil linseed oil, an alkyd resin, e.g., Alkydal L Extra, and sufficient hydrous metal oxide coated rutile $TiO_2$ pigment, prepared according to the instant invention, to provide a pigment to solid vehicle ratio of 0.8:1. To this dispersion was added a drier which in this instance was a cobalt-lead naphthenate. The mixture was then sent twice through a three-roll roller mill to form a uniform dispersion of the pigment in the alkyd resin vehicle.

The varnish so formed was then applied by means of a conventional film-forming device to a glass plate to form a layer thereon $100\mu$ in thickness. After drying the layer of varnish for 48 hours at room temperature a second layer of varnish was applied in a manner similar to that of the first after which the varnished plates were stored for 8 days.

The varnished plates were then taken from storage and weathered for from 380 to 520 hours (see examples for specific periods) in a standard Xenotest W device of the Quarzlampen G.m.b.H., Hanau, using regular procedures wherein the air humidity stood at about 80%. The gloss value of each weathered varnished plate was determined by means of the 20° glossmeter test using a Gardener 20° Glossmeter (Gardener Laboratory, Bethesda, Maryland). Chalking was determined by means of a Kempf stamper (Erichsen Co., Hemer-Sundwig, Westphalia, Germany) using a rubber stamper 2 cm. in diameter. The degree of chalking was estimated visually.

The following examples serve to illustrate the invention in greater detail. The product of each example was tested for gloss retention and chalk resistance according to the methods described above and the results are recorded below in Tables 1 and 2.

*Example 1*

Calcined rutile $TiO_2$ pigment was slurried in demineralized water with the addition of sodium hexametaphosphate as dispersing aid. The suspension was freed of all coarse particles by wet-milling in a ball mill and classifying in a centrifuge. For the first post-calcination treatment one liter of this suspension (corresponding to 300 g. $TiO_2$) was heated to 60° C. The following additions were made consecutively to the slurry while stirring continuously and maintaining the temperature constant:

(1) 28.4 ml. of a sodium silicate solution containing 190 g.p.l. $SiO_2$, corresponding to 1.8% $SiO_2$ on the basis of the pigment used; after addition of the silicate stirring was continued for 10 minutes.

(2) A solution of 41.2 g. $Al_2(SO_4)_3 \cdot 18H_2O$ in 100 ml. water, corresponding to 2.1% $Al_2O_3$ on the basis of pagment used; following the addition of the aluminum salt stirring was continued for 10 minutes.

(3) Dilute ammonia solution up to a pH 8.1; stirring was continued for 30 minutes after addition of the ammonia solution.

The pH of the suspension was measured repeatedly and maintained at about 8.1 by further addition, if necessary, of dilute ammonia. The suspension was dewater by suction, washed repeatedly with demineralized water and dried in an electric drying oven at 120° C. for 15–20 hours. Subsequently the pigment was finally milled.

After the first post-calcination treatment the oxide-coated rutile pigment was subjected to a second post-calcination treatment as follows: 300 g. of the oxide-coated pigment were slurried in demineralized water with the addition of sodium hexametaphosphate, as a dispersing aid, and soda lye; the volume of the suspension was 1 liter, the pH value 9.5–10.0. The suspension was then heated to 60° C. The following additions were made to the slurry while stirring vigorously:

(1) 31.6 ml. of a water glass solution with a content of 190 g.p.l. $SiO_2$, corresponding to 2.0% $SiO_2$, on the basis of pigment used; stirring was continued for 10 minutes.

(2) A solution of 39.2 g. $Al_2(SO_4)_3 \cdot 18\ H_2O$ in 100 ml. water, corresponding to 2.0% $Al_2O_3$ on the basis of pigment used; stirring was continued for 10 minutes after addition of the aluminum salt.

(3) Dilute ammonia solution up to pH 8.1; stirring was continued for 30 minutes and the pH was readjusted to 8.1.

The suspension was then dewatered and washed repeatedly with demineralized water. The pigment cake was dried in an electric drying oven for 15–20 hours at 120 C. Subsequently the pigment was finely milled on a jet mill.

*Example 2*

A calcined rutile pigment having a first post-calcination treatment wtih silica and hydrated aluminum oxide was slurried in demineralized water to form an aqueous suspension as described in Example 1 to which the following salt solutions were added for effecting the second post-calcination treatment:

(1) 31.6 ml. of a sodium silicate solution having a content of 190 g.p.l. $SiO_2$, corresponding to 2% $SiO_2$ on the basis of pigment treated. This was followed by stirring for 10 minutes.

(2) A solution of 39.2 g. $Al_2(SO_4)_3 \cdot 18\ H_2O$ in 100 ml. water corresponding to 2% $Al_2O_3$ on the basis of pigment treated, followed by stirring for 10 minutes.

(3) 30 ml. of a titanyl sulfate solution having a content of 100 g.p.l. $TiO_2$ corresponding to 1% $TiO_2$ on the basis of pigment treated; stirring was continued after the addition of the titanyl sulfate for 10 minutes.

(4) Dilute ammonia solution to pH 8.1; stirring was continued for 30 minutes and the pH readjusted to 8.1.

Subsequently the pigment was processed further as described in Example 1.

*Example 3*

A calcined rutile pigment having a first post-calcination treatment with hydrated silica and hydrated alumina, as in Example 1, was given a second post-calcination treatment by slurrying the coated pigment in demineralized water, as described in Example 1, to which was added the following salt solutions in sequence:

(1) 30 ml. of a titanyl sulfate solution having a content of 100 g.p.l. corresponding to 1% $TiO_2$ on the basis of pigment treated; stirring was continued for 10 minutes.

(2) 31.6 ml. of a water glass solution having a content of 190 p.g.l. $SiO_2$ corresponding to 2% $SiO_2$ on the basis of pigment treated; stirring was continued for 10 minutes after the addition.

(3) A solution of 39.6 g. $Al_2(SO_4)_3 \cdot 18 H_2O$ in 100 ml. water corresponding to 2% $Al_2O_3$ on the basis of pigment treated; stirring was continued for 10 minutes.

(4) Dilute ammonia solution up to pH 8.1; stirring was continued for 30 minutes and the pH readjusted to 8.1.

The pigment was then processed further as described in Example 1.

*Example 4*

A calcined rutile pigment having a first post-calcination treatment with hydrated silica and alumina, as in Example 1, was suspended in demineralized water, as described in Example 1, to which suspension was added the following salt solutions in sequence for effecting the second post-calcination treatment:

(1) 15.8 ml. of a sodium silicate solution having a content of 190 g.p.l. $SiO_2$, corresponding to 1% $SiO_2$ on the basis of pigment treated; stirring was continued for 10 minutes after the addition.

(2) A solution of 19.6 g. $Al_2(SO_4)_3 \cdot 18H_2O$ in 50 ml. water corresponding to 1% $Al_2O_3$ on the basis of pigment treated; stirring was continued for 10 minutes.

(3) Dilute ammonia solution up to pH 5.0; stirring was then continued for 10 minutes.

(4) A solution of 10 g. $(NH_4)_2 HPO_4$ in 100 ml. water; stirring was then continued for 10 minutes.

(5) A solution of 4.7 g. $MnSO_4, 4H_2O$ in 50 ml. water, corresponding to 0.5% MnO on the basis of pigment treated; subsequently stirring was continued for 10 minutes.

(6) Dilute ammonia solution to pH 8.1; stirring was then continued for 30 minutes and pH readjusted to 8.1.

The pigment was then processed further as described in Example 1.

The calcined rutile pigments having two post-calcination treatments according to Examples 1–4 are compared in Table 1 below with a rutile pigment having only one calcination treatment which was equivalent to that described in the first step of Example 1.

liter of this suspension (corresponding to 300 g. $TiO_2$) was heated to 60° C. The following additions were made to the suspension consecutively while stirring constantly and maintaining the temperature substantially constant:

(1) 15.8 ml. of a sodium silicate solution with a content of 190 g.p.l. $SiO_2$ corresponding to 1% $SiO_2$ on the basis of pigment used; after the addition of the silicate stirring was continued for 10 minutes.

(2) A solution of 19.6 g. $Al_2(SO_4)_3 \cdot 18H_2O$ in 50 ml. water corresponding to 1% $Al_2O_3$, on the basis of pigment treated; stirring was continued for 10 minutes.

(3) Dilute ammonia solution up to pH 8.1; stirring was continued for 30 minutes.

The pH was determined at several times and maintained at 8.1 by addition, if necessary, of dilute ammonia. The suspension was dewatered, washed repeatedly with demineralized water and dried in an electric drying oven at 120° C. for 15–20 hours. The pigment was then finely milled.

After the first post-calcination treatment the rutile pigment was given a second post-calcination treatment for additional improvement in pigmentary properties as follows:

300 g. of the treated pigment were slurried in demineralized water with the addition of sodium hexametaphosphate as dispersing agent and of soda lye; the volume of the suspension was 1 liter, the pH 9.5–10.0. The suspension was then heated to 60° C. The following additions were made to the suspension while stirring vigorously:

(1) 12.6 ml. of a sodium silicate solution having a content of 190 g.p.l. $SiO_2$ corresponding to 0.8% $SiO_2$ on the basis of pigment treated followed by stirring for 10 minutes.

(2) A solution of 2.16 g. $Al_2(SO_4)_3 \cdot 18H_2O$ in 50 ml. water corresponding to 1.1% $Al_2O_3$ on the basis of pigment treated, followed by stirring for 10 minutes.

(3) Dilute ammonia solution to a pH of 8.1, followed by stirring for 30 minutes. The pH was then readjusted to 8.1. Subsequently the pigment was processed further as described in Example 1.

TABLE 1

| Ex. No. | Treatment of the Pigment | | Gloss Retention [1] | Chalking Resistance [2] |
|---|---|---|---|---|
| | First post-calcn. with— | Second post-calcn. with— | | |
| | 1.8% $SiO_2$, 2.1% $Al_2O_3$ | | 8 | 4 |
| 1 | 1.8% $SiO_2$, 2.1% $Al_2O_3$ | 2.0% $SiO_2$, 2.0% $Al_2O_3$ | 27 | 2 |
| 2 | 1.8% $SiO_2$, 2.1% $Al_2O_3$ | 2.0% $SiO_2$, 2.0% $Al_2O_3$, 1.0% $TiO_2$. | 32 | 1 |
| 3 | 1.8% $SiO_2$, 2.1% $Al_2O_3$ | 1.0% $TiO_2$, 2.0% $SiO_2$, 2.0% $Al_2O_3$. | 70 | 0–1 |
| 4 | 1.8% $SiO_2$, 2.1% $Al_2O_3$ | 1.0% $SiO_2$, 1.0% $Al_2O_3$, 0.5% MnO (as Manganese (II) Phosphate). | 51 | 1 |

[1] Gloss after 440 hrs. weathering in the Xenotest device in percent initial gloss, measured with 20° glossmeter.
[2] Chalking step after 520 hrs. weathering in the Xenotest device 0=no chalking, 1=very slight chalking, 2=slight chalking, 3=definite chalking, 4=strong chalking, 5=very strong chalking.

The following examples will show that an excellent improvement of gloss retention and chalk resistance of a calcined rutile pigment is obtained, according to the invention, even when relatively small amounts of water-soluble salts are used in the first and the second post-calcination treatments.

*Example 5*

Calcined rutile pigment was slurried in demineralized water with the addition of sodium hexametaphosphate as a dispersing aid. The suspension was freed of all coarse particles by wet milling in a ball mill and classifying in a centrifuge. For the first post-calcination treatment one

*Example 6*

A calcined rutile pigment having a first post-calcination treatment with hydrated silica and alumina, was slurried in water as described in Example 5. The following solutions were added to the suspension for the second post-calcination treatment:

(1) 30 ml. of a titanyl sulfate solution with a content of 100 g.p.l. $TiO_2$, corresponding to 1.0% $TiO_2$ on the basis of pigment treated; this was followed by stirring for 10 minutes.

(2) 15.8 ml. of a sodium silicate solution with a content of 190 g.p.l. $SiO_2$ corresponding to 1% $SiO_2$ on the basis of pigment treated, followed by stirring for 10 minutes.

(3) A solution of 19.6 g. $Al_2(SO_4)_3 \cdot 18H_2O$ in 50 ml. water, corresponding to 1% $Al_2O_3$ on the basis of pigment treated. Stirring was then continued for 10 minutes.

(4) Dilute ammonia solution up to pH 8.1, followed by stirring for 30 minutes. The pH was then readjusted to 8.1. Subsequently the pigment was processed further as in Example 1.

*Example 7*

A calcined rutile pigment having a first post-calcination treatment with hydrated silica and alumina, was slurried in demineralized water as described in Example 5. For the second post-calcination treatment the following solutions were added to the suspension:

(1) 30 ml. of a titanyl sulfate solution with a content of 100 g.p.l. $TiO_2$ corresponding to 1% $TiO_2$ on the basis of pigment treated. This was followed by stirring for 10 minutes.

(2) 31.6 ml. of a sodium silicate solution having a content of 190 p.g.l. $SiO_2$ corresponding to 2% $SiO_2$, on the basis of pigment treated, followed by stirring for 10 minutes.

(3) A solution of 39.2 g. $Al_2(SO_4)_3 \cdot 18H_2O$ in 100 ml. water corresponding to 2% $Al_2O_3$ on the basis of pigment treated, followed by stirring for 10 minutes.

(4) Dilute ammonia solution up to pH 8.1 followed by stirring for 30 minutes and readjustment of pH to 8.1. Subsequently the pigment was processed further, as described in Example 1.

The rutile pigments having post-calcination treatments according to Examples 5–7 are compared, in a second weathering series in Table II below with a rutile pigment that had received only one post-calcination treatment and which had been prepared as described in the first step of Example 1.

lency range of the appended claims are intended to be embraced therein.

We claim:

1. Process for producing a rutile $TiO_2$ pigment having improved gloss retention and chalking resistance which comprises: initially admixing said rutile pigment in an aqueous slurry with water-soluble salts of aluminum and silicon, each salt in an amount from 1.0 to 2.0% calculated as the hydrous oxides on a $TiO_2$ weight basis, adjusting the pH of the admixture to hydrolyze said salts to precipitate and coat said pigment with a first coating consisting of the hydrous oxides of aluminum and silicon, heating the hydrous oxide coated pigment to a temperature sufficiently high to dry said hydrous oxides, subsequently admixing said oxide coated pigment in an aqueous slurry with water-soluble salts of aluminum and silicon, each salt in an amount within the range of from 0.5 to 5.0% calculated as the hydrous oxides on a $TiO_2$ weight basis, adjusting the pH of the admixture to hydrolyze said water-soluble salts and precipitate a second coating consisting of the corresponding hydrous oxides on said coated pigment, and then drying the coated pigment.

2. Process according to claim 1 wherein the water-soluble salts used in said subsequent treatment are sodium silicate and aluminum sulfate, each salt in an amount in the range of from 1.0 to 2.0% calculated as the hydrous oxides on a $TiO_2$ weight basis.

3. Process for producing a rutile $TiO_2$ pigment having improved gloss retention and chalking resistance which comprises: initially admixing said rutile pigment in an aqueous slurry with water-soluble salts of aluminum and silicon, each salt in an amount from 1.0 to 2.0% calculated as the hydrous oxides on a $TiO_2$ weight basis, adjusting the pH of the admixture to hydrolyze said salts to precipitate and coat said pigment with a first coating consisting of the hydrous oxides of aluminum and silicon,

TABLE 2

| Ex. No. | Treatment of the Pigment | | Gloss Retention [1] | Chalking Resistance [2] |
|---|---|---|---|---|
| | First post-calcn. with— | Second post-calcn. with— | | |
| | 1.8% $SiO_2$, 2.1% $Al_2O_3$ | | 20 | 4 |
| 5 | 1.0% $SiO_2$, 1.0% $Al_2O_3$ | 0.8% $SiO_2$, 1.1% $Al_2O_3$ | 43 | 1 |
| 6 | 1.0% $SiO_2$, 1.0% $Al_2O_3$ | 1.0% $TiO_2$, 1.0% $SiO_2$, 1.0% $Al_2O_3$. | 55 | 0–1 |
| 7 | 1.0% $SiO_2$, 1.0% $Al_2O_3$ | 1.0% $TiO_2$, 2.0% $SiO_2$, 2.0% $Al_2O_3$. | 62 | 0–1 |

[1] Gloss after 380 hours weathering in the Xenotest device in percent initial gloss, measured with 20° glossmeter.
[2] Chalking step after 448 hours weathering in the Xenotest device. 0=no chalking 1=very slight chalking, 2=slight chalking, 3=definite chalking, 4=strong chalking, 5=very strong chalking.

The figures recorded in Tables 1 and 2 above show clearly that it is possible by the process according to the invention to produce outstanding chalking resistance and gloss retention by a double-calcination treatment. Moreover when, in the second post-calcination treatment, a titanium salt is employed in addition to a silicate and an aluminum salt, then chalking resistance and gloss retention are even more improved. A particularly strong improvement in chalking resistance and gloss retention of the rutile pigment is obtained by adding the salts in the second post-calcination treatment in the sequence titanium salt, silicate, aluminum salt (see Table 1, Example 3).

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

subsequently admixing said oxide coated pigment in an aqueous slurry with water-soluble salts of aluminum and silicon and one only of a water-soluble salt of a metal selected from the group consisting of titanium and manganese, each salt in an amount within the range of from 0.5 to 5.0% calculated as the hydrous oxides on a $TiO_2$ weight basis, adjusting the pH of the admixture to hydrolyze said water-soluble salts and precipitate a second coating consisting of the corresponding hydrous oxides on said coated pigment, and then drying the coated pigment.

4. Process according to claim 3 wherein the hydrous oxides precipitated on said pigment by said initial treatment are dried prior to subjecting said pigment to said second coating of hydrous oxides.

5. Process according to claim 3 wherein the water-soluble salts used in said subsequent treatment are aluminum, sodium silicate, and titanyl sulfate, each of said aluminum sulfate and sodium silicate being used in an amount from 1.0 to 2.0% calculated as the oxides on a $TiO_2$ weight basis, and said titanyl sulfate being used in an amount of about 1.0% calculated as the oxide on a $TiO_2$ weight basis.

6. Process according to claim 3 wherein the water-soluble salts used in said subsequent treatment are aluminum sulfate, sodium silicate and manganese phosphate, each of said aluminum sulfate and sodium silicate being used in an amount from 1.0% to 2.0% calculated as the oxides on a $TiO_2$ weight basis, and said manganese phosphate being used in an amount of about 0.5% calculated as the oxide on a $TiO_2$ weight basis.

References Cited by the Examiner

UNITED STATES PATENTS

| | | | |
|---|---|---|---|
| 2,218,704 | 10/1940 | Erskine | 106—300 |
| 2,671,031 | 3/1954 | Whately | 106—300 |
| 3,035,966 | 5/1962 | Siuta | 106—300 |

TOBIAS E. LEVOW, *Primary Examiner.*